Patented Dec. 4, 1928.

1,694,127

UNITED STATES PATENT OFFICE.

OTTO LEUCHS, OF ELBERFELD, AND EDUARD DÖRR, OF ELBERFELD-SONNBORN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

PROCESS FOR THE MANUFACTURE OF CELLULOSE ETHERS.

No Drawing. Application filed October 31, 1927, Serial No 230,180, and in Germany November 8, 1926.

The present invention concerns the manufacture of cellulose ethers and consists in the removal of water during the etherification and the addition of caustic alkalies to the alkylating mixture.

In the known processes for the manufacture of cellulose ethers it has been customary to incorporate the quantity of caustic alkali requisite for the reaction with the reaction mixture either in one operation and then to dry, if desired, and alkylate, or to add the alkali during the course of the alkylation in small amounts at a time.

In accordance with the present invention these operations can be combined, provided that the process is carried out in such a manner that a vessel containing caustic alkali for example, caustic soda or the like, is placed within the alkylating vessel itself or connected with the same, so that the caustic soda can absorb water from the alkylating mass, whereby the latter is dried and the alkali itself liquefies to a concentrated solution which, as such can reach the reaction mixture during the course of the reaction. As a consequence the caustic alkali lye in the alkylating mixture is automatically and continually concentrated and increases in one single operation during the alkylation.

By way of illustrating our invention the process is for example, carried out in the following manner:—Alkali cellulose and ethylchloride are heated in the customary manner in a stirring autoclave, in the upper part of which however a perforated vessel is placed, which is charged with solid caustic soda. At the commencement of heating the autoclave the ethylchloride first reacts with the alkali cellulose, while simultaneously water is abstracted from the reaction mixture owing to the presence of solid caustic soda in the vessel placed above. The caustic soda commences gradually to pass into solution on account of the absorbed water, it then drops down into the alkylating mixture and thus replaces the caustic soda solution, which meanwhile has been used up in the reaction between the alkali cellulose and the ethylchloride. In this manner caustic alkali is automatically introduced to the alkali cellulose during the course of the reaction. The quantity of alkali in the vessel placed above can be so arranged that the alkali passes completely into solution, or that it is present in excess, that is to say, that only a part of the same dissolves; or the process may be effected in such a manner that yet a second vessel is arranged in the upper part of the autoclave, which is charged with a drying agent, such as for example, with calcium chloride.

The mode of working above described shows an essential simplification compared with the known processes since the operations hitherto carried out consecutively and separately, such as drying of the alkali cellulose and the repeated additions of caustic soda or caustic soda lye and the like are incorporated into a single working operation.

We claim:

1. In the process for the manufacture of cellulose ethers, the step which comprises the removal of water during the etherification and the addition of caustic alkalies to the alkylating mixture.

2. In the process for the manufacture of cellulose ethers, the step which comprises the removal of water during the etherification and the addition of caustic alkalies to the alkylating mixture in one single working operation.

In testimony whereof we have hereunto set our hands.

OTTO LEUCHS.
EDUARD DÖRR.